United States Patent [19]

Ikeda et al.

[11] 4,039,491

[45] Aug. 2, 1977

[54] NOVEL COPOLYMER AND PROCESS FOR PRODUCING SAME

[75] Inventors: Hiroharu Ikeda, Machida; Shuichi Matsumoto; Hiroji Enyo, both of Yokohama; Noboru Oshima; Koei Komatsu, both of Yokkaichi, all of Japan

[73] Assignee: Japan Synthetic Rubber Co., Ltd., Tokyo, Japan

[21] Appl. No.: 583,177

[22] Filed: June 2, 1975

[30] Foreign Application Priority Data

May 17, 1975 Japan .................................. 50-56769

[51] Int. Cl.$^2$ .................. C08F 253/00; C08F 255/06; C08F 257/02; C08F 279/02
[52] U.S. Cl. .................................. 260/4 R; 260/875; 260/878 R; 260/879
[58] Field of Search ............... 260/879, 4, 875, 878 R, 260/879 R

[56] References Cited

FOREIGN PATENT DOCUMENTS 59,500   5/1975   Japan .................................. 260/879

*Primary Examiner*—Alan Holler
*Attorney, Agent, or Firm*—Oblon, Fisher, Spivak, McClelland & Maier

[57] ABSTRACT

A novel copolymer is obtained by reacting [A] at least one norbornene derivative having at least one polar group or polar-group-containing substituent with [B] at least one unsaturated polymer having carbon-to-carbon double bonds in the presence of a metathesis catalyst. This copolymer is excellent in chemical and mechanical properties. Particularly, when 50% by weight or more of the component [A] is contained, the resin is distinguished for its high impact strength.

31 Claims, No Drawings

NOVEL COPOLYMER AND PROCESS FOR PRODUCING SAME

This invention relates to a novel copolymer and to a process for producing the same. More particularly, this invention relates to a novel copolymer excellent in chemical and mechanical properties, which is derived from an unsaturated polymer containing in the molecule carbon-to-carbon double bonds and a norbornene derivative containing a polar substituent, and to a process for producing said copolymer.

The term "copolymer" used in the specification and claims means to include a block copolymer, a graft copolymer, a block graft copolymer and mixtures thereof.

The block or graft copolymer derived from a polymer having unsaturation, such as polybutadiene or polyisoprene, used as one of the components, has attracted special attention as a novel polymer material having specific mechanical properties and become a subject of various studies. One of the methods for producing such a copolymer consists in polymerizing stepwise a diene, such as butadiene or isoprene, and a second monomer by use of a anionic polymerization initiator such as an organolithium compound. When an aromatic vinyl compound is used as the second monomer, this method makes it possible to produce a block copolymer having a controlled chain length of each block and a controlled molecular weight distribution. Thus, a copolymer produced from styrene and butadiene or isoprene is now attracting the attention of industrial circles as an interesting thermoplastic elastomer.

In order to obtain by the above method a copolymer with a high yield, however, it is necessary to regulate strictly the amounts of impurities, such as water, oxygen, and the like, contained in the monomers and solvents for use in the reaction. Also, the types of monomers to be used are rather limited and it is impossible to use polydienes produced by other methods such as, for example, emulsion polymerization.

Another method for producing a block or graft copolymer comprises reacting a mixture of a polymer and a monomer in the presence of a radical initiator by exposing the mixture to light, radiation, heat, or mechanical energy. Although this method is applicable to polymers and monomers selected from a considerably wide range, it is difficult to control the molecular weight and its distribution by this method, and a homopolymer is liable to be formed by chain-transfer reaction. Other undesirable side reactions such as decomposition of the polymer and insolubilization by crosslinking may also occur as a result of radical reactions particularly in the case of polydienes.

A further method for producing such a polymer comprises contacting a polymer having carbon-to-carbon double bonds and a cycloalkene with a catalyst containing a tungsten or molybdenum compound as the principal constituent. The block or graft copolymer obtained by this method, however, is limited to a hydrocarbon copolymer.

Quite recently, on the other hand, there has been proposed a method for producing a polymer obtained by ring-opening polymerization (hereinafter referred to as ring-opened polymer) of a norbornene derivative containing as substituent a polar group such as nitrile, ester, or the like group. The resulting ring-opened polymer, however, has a low impact strength which is not sufficiently high for a polymer to be used in various molded articles. Consequently, it is generally required to develop a method for improving sufficiently the impact strength of the ring-opened polymer of a polar-group-substituted norbornene derivative keeping the excellent properties of the ring-opened polymer, such as heat distortion temperature, tensile strength, hardness, etc.

The present inventors conducted extensive research on the development of novel polymers to find that when the unsaturated polymers are contacted with norbornene derivatives having polar groups such as ester group, nitrile group or the like in the presence of a compound of tungsten, molybdenum, rhenium, or tantalum, copolymers are formed and the resulting copolymer is a novel copolymer improved in chemical and mechanical properties as compared with the starting polymer, and the ring-opened polymer of the polar-group-substituted norbornene derivative.

An object of this invention is to provide a novel copolymer excellent in chemical and mechanical properties.

Another object of this invention is to provide a novel impact-resistant thermoplastic resin.

As still another object of this invention is to provide a novel resin excellent not only in impact strength but also in transparency.

A further object of this invention is to provide a novel resin excellent in flame retardancy and impact strength.

A still further object of this invention is to provide a resin composition excellent in tensile strength, head distortion temperature, and hardness.

A still further object of this invention is to provide a process for producing the above-said novel copolymer.

According to this invention there is provided a process for producing a copolymer, which comprises reacting [A] at least one norbornene derivative having at least one polar group or polar-group-containing substituent (hereinafter referred to as polar-group-substituted norbornene derivative) and [B] at least one unsaturated polymer having carbon-to-carbon double bonds with a metathesis catalyst; and also provided a novel copolymer obtained by said process.

The term "polar-group-substituted norbornene derivative" used herein means a norbornene derivative having at least one polar substituent selected from the class consisting of ester group, nitrile group, amino group, halogen atoms, imino group, carboxylic anhydride groups and substituents containing these groups.

Examples of the polar-group-substituted norbornene derivatives [B] include compounds represented by the general formula:

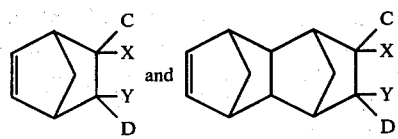

wherein C and D are independently hydrogen or hydrocarbon groups having 1 to 10 carbon atoms; X and Y are independently hydrogen, hydrocarbon groups having 1 to 10 carbon atoms, halogen atoms, halohydrocarbon groups having 1 to 10 carbon atoms, $-(CH_2)_n COOR^1$, $-(CH_2)_n OCOR^1$, $-(CH_2)_n CN$, $-(CH_2)_n$-

CONR²R³, —(CH₂)ₙCOOZ, —(CH₂)ₙOCOZ, or —(CH₂)ₙOZ; X and Y may jointly form

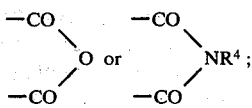

at least one of X and Y is the said group other than hydrogen and the hydrocarbon group; R¹, R² and R³ are independently hydrocarbon groups having 1 to 20 carbon atoms, R⁴ is hydrogen or a hydrocarbon group having 1 to 20 carbon atoms, Z is a halohydrocarbon group having 1 to 20 carbon atoms, and n is 0 or an integer from 1 to 10.

Examples of the compounds represented by the formula

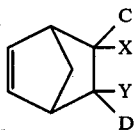

include methyl 5-norbornene-2-carboxylate, ethyl 5-norbornene-2-carboxylate, methyl 2-methyl-5-norbornene-2-carboxylate, butyl 3-phenyl-5-norbornene-2-carboxylate, dimethyl 5-norbornene-2,3-dicarboxylate, cyclohexyl 5-norbornene-2-carboxylate, allyl 5-norbornene-2-carboxylate, 5-norbornene-2-yl acetate, 5-norbornene-2-nitrile, 3-methyl-5-norbornene-2-nitrile, 2,3-dimethyl-5-norbornene-2,3-dinitrile, 5-norbornene-2-carboxamide, N-methyl-5-norbornene-2-carboxamide, N,N-diethyl-5-norbornene-2-carboxamide, N,N,N',N'-tetramethyl-5-norbornene-2,3-dicarboxamide, 2-chloro-5-norbornene, 2-methyl-2-chloro-5-norbornene, chloroethyl 5-norbornene-2-carboxylate, dibromopropyl 5-norbornene-2-carboxylate, dichloropropyl 5-norbornene-2-carboxylate, monochlorophenyl 5-norbornene-2-carboxylate, monobromophenyl 5-norbornene-2-carboxylate, tribromophenyl 5-norbornene-2-carboxylate, 2-bromo-5-norbornene, 2-bromomethyl-5-norbornene, tribromobenzyl 5-norbornene-2-carboxylate, 5-norbornene-2,3-dicarboxylic anhydride, 2,3-dimethyl-5-norbornene-2,3-dicarboxylic anhydride, 5-norbornene-2,3-dicarboximide, and N-phenyl-2-methyl-5-norbornene-2,3-dicarboximide. Examples of the compounds represented by the general

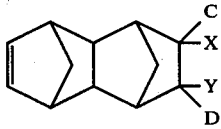

include 2-cyano-1,2,3,4,4a,5,8,8a-octahydro-1,4;5,8-dimethanonaphthalene, 2-carbomethoxy-1,2,3,4,4a,5,8,-8a-octahydro-1,4;5,8-dimethanonaphthalene, and 2-chloro-1,2,3,4,4a, 5,8,8a-octahydro-1,4;5,8-dimethanonaphthalene.

Typial examples of th suitable unsaturated polymers [B] having carbon-to-carabon double bonds are polybutadiene, styrene-butadiene copolymer, acrylonitrilebutadiene copolymer, polychloroprene, polyisoprene, natural rubber, ethylene-propylene-diene terpolymer, polyalkenamer, and butyl rubber. The type of these polymers may be liquid, rubbery, or resin, but rubbery type is particularly preferred from the viewpoint of improvement of the impact strength.

The metathesis catalyst used in the present process is normally a catalyst system consisting essentially of a combination of (a) at least one compound selected from the compounds of W, Mo, Re, and Ta and (b) at least one compound selected from the compounds of elements of Groups IA, IIA, IIB, IIIA, IVA, and IVB of Deming's Periodic Table which have at least one element-to-carbon bond or element-to-hydrogen bond. The catalyst, if necessary, may contain and additive to enhance the activity.

Compounds of W, Mo, Re, and Ta suitable for the component (a) are halides, oxyhalides, alkoxyhalides, phenoxyhalides, alkoxides, phenoxides, carboxylates, (oxy)acetylacetonates, carbonyl complexes, acetonitrile complexes and hydride complexes of said metals, derivatives of these compounds, and combinations of two or more of these compounds. In view of polymerization activity and availability, preferable compounds are those of W and Mo, particularly halides, oxyhalides, alkoxyhalides and phenoxyhalides of these two metals. Mixtures of two or more compounds which may react to form the above compounds are also suitable. The above compounds may be complexed with complexing agents such as $P(C_6H_5)_3$ and $C_5H_5N$.

Examples of individual compounds include $WCl_6$, $WCl_5$, $WCl_4$, $WBr_6$, $WF_6$, $WI_6$, $MoCl_5$, $MoCl_4$, $MoCl_3$, $ReCl_5$, $TaCl_5$, $TaBr_5$, $WOCl_4$, $MoOCl_3$, $ReOCL_3$, $ReOBr_3$, $W(OC_6H_5)_6$, $WCl_2(OC_6H_5)_4$, $Mo(OC_2H_5)_2Cl_3$, $Mo(OC_2H_5)_5$, $MoO_2(acac)_2$, $W(OCOR)_3$, $W(CO)_6$, $Mo(CO)_6$, $Re_2(CO)_{10}$, $ReOBr_3.P(C_6H_5)_3$, $WCl_5.P(C_6H_5)_3$, $WCl_6.C_5H_5N$, $W(CO)_5.P(C_6H_5)_3$ and $W(CO)_3(CH_3CN_3$, in which acac means acetylacetonate.

Compounds suitable for the component (b) are those compounds of elements of Groups IA, IIA, IIB, IIIA, IVA, and IVB of the Periodic Table which have at least one element-to-carbon bond or element-to-hydrogen bond. Examples of the compounds include $n\text{-}C_4H_9Li$, $n\text{-}C_5H_{11}Na$, $C_5H_5Na$, $CH_3MgI$, $C_2H_5MgBr$, $CH_3MgBr$, $n\text{-}C_3H_7MgCl$, $t\text{-}C_4H_9MgCl$, $CH_2=CH-CH_2-Mg-Cl$, $(C_2H_5)_2Zn$, $(C_2H_5)_2Cd$, $CaZn(C_2H_5)_4$, $(CH_3)_3B$, $(C_2H_5)_3B$, $(n\text{-}C_4H_9)_3B$, $(CH_3)_3Al$, $(CH_3)_2AlCl$, $(CH_3)_3Al_2Cl_3$, $CH_3AlCl_2$, $(C_2H_5)_3Al$, $LiAl(C_2H_5)_4$, $(C_2H_5)_3Al.O(C_2H_5)_2$, $(C_2H_5)_2AlCl$, $C_2H_5AlCl_2$, $(C_2H_5)_2AlH$, $(iso\text{-}C_4H_9)_2AlH$, $(C_2H_5)_2AlOC_2H_5$, $(iso\text{-}C_4H_9)_3Al$, $(C_2H_5)_3Al_2Cl_3$, $(CH_3)_4Ge$, $(CH_3)_4Sn$, $(n\text{-}C_4H_9)_4Sn$, $(n\text{-}C_6H_{13})_3Al$, $(n\text{-}C_8H_{17})_3Al$, $LiH$, $NaH$, $B_2H_6$, $NaBH_4$, $AlH_3$, $LiAlH_4$, $TiH_4$. Mixtures of two or more compounds which may react to form the above compounds are also suitable. Preferable compounds are organometallic compounds of Zn, B, Al, and Sn, and most preferable is Al.

The suitable ratio of the component (a) to the component (b) in terms of number of metal atoms is in the range from 1:1 to 1:20, preferably from 1:2 to 1:10.

Although the catalyst prepared from the components (a) and (b) has generally a high activity for the polymerization according to this invention, it is possible to add a component (c) (activator), as given below, to obtain a more active catalyst.

Various compounds may be used for the component (c), but particularly preferred are those given below.

(1) Organo-and non-organo- compounds of boron such as $BF_3$, $BCl_3$, $B(O\text{-}n\text{-}C_4H_9)_3$, $(C_2H_5O)_2BF$, $B_2O_3$, and $H_3BO_3$; and organo compounds of silicon such as $Si(OC_2H_5)_4$; (2) alcohols, hydroperoxides, and peroxides; (3) water; (4) oxygen; (5) carbonyl compounds such as aldehydes and ketones; (6) cyclic ethers such as ethylene oxide, epichlorohydrin, dioxane, trioxane and oxetane; (7) amides such as N,N-diethylformamide, and N,N-dimethylacetamide; amines such as aniline, morpholine, and piperidine; azo compounds such as azobenzene; (8) N-nitroso compounds such as N-nitrosodimethylamine and N-nitrosodiphenylamine; and (9) compounds containing S-Cl group or N—Cl group such as trichloromelamine, N-chlorosuccinimide, and phenylsulfonyl chloride.

In carrying out the present process, the unsaturated polymer having carbon-to-carbon double bonds is generally dissolved in a suitable solvent (for example, aliphatic, cycloaliphatic, or aromatic hydrocarbons or halohydrocarbons), although in some cases the polymer can be dissolved in the monomers.

To the resulting solution, after adding, if necessary, other solvents, is added the aforesaid monomeric norbornene derivative, before or after introduction of the catalyst components. Since the catalyst for use in the present process is relatively sensitive to atmospheric oxygen and moisture, the reaction is generally carried out under an inert atmosphere, such as nitrogen, helium, or argon. The solvent, polymer, and monomer are preferably deaerated and dried before use. The reaction is carried out at a temperature in the range from −30° to 200° C., preferably not exceeding 150° C.

The copolymer obtained in this way may contain the polar-group-substituted norbornene derivative in various proportions, e.g. 0.1 to 99% by weight, depending on the ratio of the unsaturated polymer having carbon-to-carbon double bonds to the polar-group-substituted norbornene derivative in the reactant mixture. Thus, it is possible to obtain a copolymer in the form of a rubber to a hard resin. A copolymer containing minor amounts, e.g. 3 to 30% by weight, of the polar-group-substituted norbornene derivative is useful as a rubber material which has excellent green strength and reduced cold-flow and yields a cured rubber having excellent tensile strength. A copolymer containing larger amounts, e.g. about 40% by weight, of the polar-group-substituted norbornene derivative than those in the above-noted copolymer is a new polymer having properties quite different from those of the initial polymer, being improved in chemical and mechanical properties.

In order to obtain a copolymer which is greatly improved in impact strength and not significantly inferior in other properties such as tensile strength, elongation, hardness, and heat distortion temperature as compared with a ring-opened polymer of the polar-group-substituted norbornene derivative, the proportion of said norbornene derivative in the copolymer is 50 to 97, preferably 70 to 95% by weight. If the unsaturated polymer content exceeds 50% by weight, the heat distortion temperature tends to decrease and processability of the copolymer in pelletizing and molding becomes deteriorated, while if the unsaturated polymer content is below 3% by weight, the impact strength is not sufficiently improved.

Although it is possible to improve the impact strength of a ring-opened polymer of the polar-group-substituted norbornene derivative by mechanically incorporating a rubbery polymer in said polymer, the degree of improvement is smaller and the whitening phenomena by bending are easier to occur as compared with a copolymer obtained according to this invention.

A transparent impact-resistant copolymer may be obtained according to this invention by use of the unsaturated polymer having a refractive index in the range from the refractive index of the ring-opened polymer of the polar-group-substituted norbornene derivative plus 0.02 to the refractive index of said polymer minus 0.025. To the contrary, when the same unsaturated polymer as used above is mechanically incorporated in the said ring-opened polymer, the resulting resin is inferior in impact strength, transparency, and stress whitening by bending as compared with the copolymer obtained above.

An impact-resistant copolymer containing 5% by weight or more of a halogen obtained according to this invention by use of a halogen-substituted norbornene derivative or a halogen-containing group-substituted norbornene derivative is excellent in flame retardancy. Although a ring-opened polymer of a halogen-substituted norbornene derivative or a halogen-containing group-substituted norbornene derivative is flame retardant, it is not satisfactory in common characteristics, particularly in impact strength, flow characteristics, etc.

As compared with the ring-opened polymer of a halogen-substituted norbornene derivative, which is defective in impact strength and flow characteristics, the halogen-containing copolymer obtained according to this invention is greatly improved in impact strength and flow characteristics and not significantly inferior in tensile strength and other properties inherent to said ring-opened polymer. The present process, therefore, is suitable for the manufacture of a flame-retardant and impact-resistant resin having no fear of toxicity and bleeding. A thermoplastic resin particularly excellent in impact strength, flame retardancy, and other properties may be obtained according to this invention by copolymerization of unsaturated polymer such as polychloroprene and a halogen-substituted norbornene derivative or a halogen-containing group-substituted norbornene derivative.

The copolymer obtained by copolymerization of [A] at least one polar-substituted norbornene derivative and [B] at least one unsaturated polymer according to this invention may be of varied nature ranging from rubber-like to hard-resin-like depending on the ratio of [A] to [B] and may be used alone or in combination with other polymers in the respective fields in accordance with the characteristic properties. The copolymer may, of course, be incorporated with stabilizers, antidegradation agents, UV absorbers, lubricants, colorants, or flame retarding additives.

When a copolymer obtained by copolymerization of [A] at least one polar-group-substituted norbornene derivative and [B] at least one unsaturated polymer in a weight ratio ([A]/[B]) of 20/80 to 90/10 is blended with a ring-opened polymer of the norbornene derivative to obtain a mixture containing 3 to 50%, preferably 5 to 30%, by weight of [B], the resulting resin composition is superior in tensile strength, heat distortion temperature, and hardness to a copolymer of the same [B] content obtained by copolymerization of [A] and [B] according to this invention.

The invention is illustrated below in further detail with reference to Examples, but the invention is not limited to the Examples.

EXAMPLE 1

In a 300-ml glass autoclave which had been flushed with nitrogen to replace the air, 4.1 g of cis-1,4-polybutadiene (JSR BR01, trademark for Japan Synthetic Rubber Co.), which had been purified by reprecipitation in toluene-methanol, dried in vacuo, and deaerated, was dissolved in 144 ml of chlorobenzene. To the resulting solution, was added 3.8 g of methyl 5-norbornene-2-carboxylate

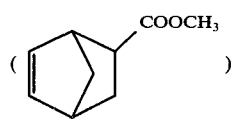
(I)

and mixed thoroughly. After the successive addition of 5 ml of a chlorobenzene solution containing $WCl_6$ (0.05 mole/liter) and 0.5 ml of a chlorobenzene solution containing $Al(C_2H_5)_3$ (1 mole/liter), the reactor was sealed and allowed to stand at 28° C. for 10 hours to allow the reaction to proceed. After completion of the reaction, the reaction solution was poured into a large amount of methanol containing small amounts of 2,6-di-tert-butyl-p-cresol (antidegradation agent). The precipitated polymer was washed thoroughly with methanol, purified by reprecipitation in toluene-methanol, and dried in vacuo to obtain 6.8 g of a purified polymer.

The purified polymer was confirmed as a copolymer by extraction with a solvent and measurements of IR absorption spectrum and a differential scanning calorimeter (DSC) in the following way.

A portion of the purified polymer was extracted in a Soxlet extractor for 5 hours with ethyl acetate which is a nonsolvent for cis-1,4-polybutadiene. It was found that all of the purified polymer were extracted leaving no residue, whereas cis-1,4-polybutadiene remained entirely unextracted under the same conditions. Hence, it was concluded that the purified polymer contained none of the unreacted cis-1,4-polybutadiene.

The purified polymer soluble in ethyl acetate was extracted with acetonitrile which is a solvent for a polymer of the compound of formula [I]. Since no extract was obtained, it was concluded that the purified polymer contained no homopolymer of the compound of formula [I].

From the observation that the IR absorption spectrum showed absorption characteristic of both the cis-1,4-polybutadiene and the polymer of formula [I] and from the results of extraction test, it may be concluded that the purified polymer was a copolymer of cis-1,4-polybutadiene and the compound of formula [I].

Since the DSC thermogram of the purified polymer showed Tg at 61° C. which corresponds to Tg of the homopolymer of the compound of formula [I], it is clear that a copolymer of cis-1,4-polybutadiene and the compound of formula [I] was formed. The weight ratio of the butadiene units to the units of the compound of formula [I] in the purified polymer was about 60:40, as calculated from the yield of the purified polymer.

The copolymer obtained was insoluble in n-heptane and cyclohexane, indicating that it is resistant to an aliphatic oil and naphthene-base oil. This copolymer had a tensile strength (green strength) of 3.52 kg/cm², whereas corresponding values of cis-1,4-polybutadiene and a blend (60/40) of cis-1,4-polybutadiene and a homopolymer of the compound of formula [I] were 0.9 kg/cm² and 1.8 kg/cm², respectively, indicating that the green tensile strength was improved by the copolymerization according to this invention.

EXAMPLE 2

In a 300-ml glass autoclave under a nitrogen atmosphere, 4.1 g of cis-1,4-polybutadiene purified in the same manner as in Example 1 (the starting polymer was the same as in Example 1) was dissolved in 140 ml of chlorobenzene. To the resulting solution was added 3.0 g of 5-norbornene-2-nitrile

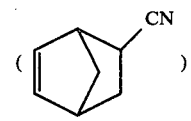
(II)

and thoroughly mixed. After the addition of 5 ml of a chlorobenzene solution containing $WCl_6$ (0.05 mole/liter) and 0.5 millimole of $(CH_3)_{1.5}AlCl_{1.5}$, the reactor was sealed and allowed to react at 70° C. for 19 hours. After completion of the reaction, the reaction mixture was treated in the same manner as in Example 1 to obtain 4.6 g of a copolymer. The IR absorption spectrum of this copolymer showed absorption characteristic of both the compound of formula [II] and the polybutadiene. Since this copolymer was soluble in toluene while a homopolymer of the compound of formula [II] was insoluble in toluene, it was concluded that this copolymer contained no homopolymer of the compound of formula [II]. Further, no extract was obtained on extraction of this copolymer with n-heptane which is a solvent for the polybutadiene. Since cis-1,4-polybutadiene was soluble in n-heptane, it was confirmed that this copolymer was a copolymer of cis-1,4-polybutadiene and the compound of formula [II]. This copolymer contained 10% by weight of the unit of the compound of formula [II], as calculated from the yield of this copolymer. The copolymer had an increased green strength of 1.50 kg/cm² as compared with 0.86 kg/cm² of the cis-1,4-polybutadiene. The copolymer was insoluble in n-heptane and cyclohexane, indicating that it is resistant to an aliphatic oil and a naphthene-base oil.

EXAMPLE 3

In a 300 -ml autoclave 5.1 g of a cis-polyisoprene (Natsyn 2200, trademark), which had been purified in the same way as in Example 1, was dissolved in 160 ml of chlorobenzene. After the addition of 1.6 g of the compound of formula [I], 5 ml of the same chlorobenzene solution containing $WCl_6$ and 0.5 millimole of $Al(C_2H_5)_3$, the reactor was sealed and kept at 28° C. for 10 hours to allow the mixture to react. The reaction mixture was treated in the same manner as in Example 1 to obtain 5.3 g of a purified polymer. The formation of a copolymer was confirmed by the extraction test with a solvent. This copolymer contained 3.7% by weight of units of the compound of formula [I], as calculated from the yield of the copolymer.

This copolymer had an increased green strength of 1.74 kg/cm² and an increased elongation of 485% as compared with respectively 0.82 kg/cm² and 300% of the cis-polyisoprene used as a starting material.

EXAMPLE 4

In a 300-ml autoclave under a nitrogen atmosphere, 5.4 g of a styrene-butadiene copolymer rubber (SBR 1500, produced by Japan Synthetic Rubber Co.), which had been purified in the same manner as in Example 1, was dissolved in 160 ml of chlorobenzene. After successive addition of 3.8 g of the compound of formula [I], 5 ml of the same chlorobenzene solution of $WCl_6$ as used in Example 1, and 0.5 millimole of $Al(C_2H_5)_3$, the reactor was sealed and allowed the reaction to proceed at 28° C. for 10 hours. After completion of the reaction the reaction mixture was treated in the same manner as in Example 1 to obtain 7.4 g of a purified copolymer. From the result of extraction test conducted in the same manner as in Example 1, it was confirmed that SBR and the compound of formula [I] were reacted to form a copolymer. The purified copolymer contained 27% by weight of the units of the compound of formula [I], as calculated from the yield of the copolymer. This copolymer was insoluble in n-heptane and cyclohexane, indicating that the copolymer is resistant to aliphatic oils and naphthene-base oils.

EXAMPLE 5

In a reactor, 5 g of an ethylene-propylenediene terpolymer rubber (propylene content, 43% by weight; iodine value, 15; diene component, ethylidenenorbornene), which had been purified as in Example 1, was dissolved in 140 ml of chlorobenzene. After successive addition of 3.8 g of the compound of formula [I], 5 ml of the same chlorobenzene solution of $WCl_6$ as used in Example 1, and 0.5 millimole of $Al(C_2H_5)_3$, the reactor was sealed and kept at 28° C. for 10 hours allow the reaction to proceed. After completion of the reaction, the reaction mixture was treated in the same manner as in Example 1 to obtain 7.9 g of a purified copolymer.

The purified copolymer was not extracted with ethyl acetate. Since the IR absorption spectrum showed characteristic absorption of the compound of formula [I], it was found that the compound of formula [I] had reacted with the EPT rubber. This copolymer contained 36% by weight of the compound of formula [I].

EXAMPLE 6

In a reactor, 4.1 g of a 1,2-polybutadiene (1,2-configuration content, 93%; intrinsic viscosity, $[\eta] = 1.25$; crystallinity, 23%), which had been purified as in Example 1, was dissolved in 140 ml of chlorobenzene. After successive addition of 3.8 g of the compound of formula [I], 5 ml of the same chlorobenzene solution of $WCl_6$, and 0.5 millimole of $Al(C_2H_5)_3$, the reactor was sealed and kept at 28° C. for 10 hours to allow the reaction to proceed. After completion of the reaction, the reaction mixture was treated as in Example 1 to obtain 5.9 g of a purified copolymer.

This copolymer completely dissolved on extraction with cyclohexane for 2 hours. The cyclohexanesoluble copolymer showed an IR absorption spectrum characteristic of both the compound of formula [I] and the 1,2-polybutadiene. Since a homopolymer of the compound of formula [I] is insoluble in cyclohexane, it was found that the copolymer obtained in this Example had been formed by grafting the compound of formula [I] onto the 1,2-polybutadiene. The grafting degree was found to be 30% by weight from the yield of the copolymer. This copolymer was a thermoplastic resin having an improved transparency as compared with a blend of both components. This copolymer had a decreased solubility in aliphatic hydrocarbons such as n-hexane, indicating an improvement in oil resistance.

EXAMPLE 7

In a 5-liter glass autoclave, under a nitrogen atmosphere, 80 g of each of the unsaturated polymers, shown in Table 1, which had been purified by reprecipitation with toluene-methanol, dried in vacuo, and deaerated, was dissolved in 1.6 liters of chlorobenzene. To the resulting solution was added 320 g of 5-norbornene-2-nitrile and mixed thoroughly. After successive addition of 100 ml of a toluene solution of $WCL_6$ (0.05 mole/liter), 7.5 ml of a toluene solution of paraldehyde (1 mole/liter), 15 ml of a toluene solution of Al (iso-$C_4H_9)_3$ (1 mole/liter), and a small amount of a toluene solution containing 1-hexene used as a molecular weight regulator (0.05 mole/liter), the mixture was allowed to react at 70° C. for 10 hours. After completion of the reaction, the reaction mixture was poured into a large quantity of methanol containing 1% of 2,6-di-tert-butyl-p-cresol and 1% of hydrochloric acid. The precipitated copolymer was washed with methanol and then purified by reprecipitation with toluene-methanol to obtain the copolymer. The above experiment was scaled up nearly proportionately in accordance with requisite quantity of the sample.

The polymeric product obtained by reprecipitation with methanol was dried in vacuo for 48 hours, crushed, and again dried under a hot air stream at 80° C. for 12 hours. A substantial part of the polymeric product thus obtained was a copolymer, as confirmed by solvent extraction tests, IR absorption spectroscopy, and calorimetry by use of a differential scanning calorimeter (DSC) in the following way. The IR absorption spectrum and the data obtained by use of DSC showed that the polymeric product obtained above is a high-molecular-weight copolymer of the both compounds used as starting materials and the extraction tests with solvents such as ethyl acetate, acetonitrile, and acetone showed that the polymer having double bonds is scarcely present as such.

The copolymer obtained in the form of small lump, if necessary, was crushed by means of a common crusher of the suitable type and pelletized by means of an extruder at a temperature set at 200° to 260° C. while applying a vacuum of −700 mmHg or higher to the vent zone. The pellets were predried in a hot-air circulating drier at 70° C. for 6 hours and molded into test specimens specified in the testing methods, as shown in Table 3, by means of an injection machine (manufactured by Yamashiro Seiki Co.) at a temperature set at 200° to 240° C. The specimens were tested for physical properties according to the testing methods as shown in Table 3. The results obtained were as tabulated in Table 2. The transparency was evaluated by visual inspection of a test specimen in the form of plate, about ⅛ inch in thickness. It was found from the results shown in Table 2 that in order to obtain a transparent copolymer resin, the polymer having double bonds, which is used as a starting material, should have a refractive index in the range from about 1.52 to 1.56, while the ring-opened polymer of 5-norbornene-2-nitrile has a refractive index of about 1.543 at 25° C. It was also found that the copolymer resin obtained according to this invention has an excellent notched Izod impact strength and a heat distortion temperature exceeding 100° C., while the notched Izod impact strength of the ring-opened polymer is 6 kg.cm/cm at 25° C.

Table 1
Unsaturated polymers having carbon-to-carbon double bonds used in Example 7

| No. | Unsaturated polymer | Refractive index (25° C.) | Brand name or method of polymerization |
|---|---|---|---|
| 1 | Natural rubber | 1.519 | Pale crepe No. 1 |
| 2 | SBR (combined ST, 23.5%; cold rubber) | 1.535 | JSR 1502 |
| 3 | SBR (combined ST, 23.5%; hot rubber) | 1.534 | Ameripol 1006 |
| 4 | NBR (combined AN, 26%) | 1.521 | JSR N240S |
| 5 | IIR | 1.508 | JSR Butyl 365 |
| 6 | CR | 1.558 | Neoprene GS |
| 7 | BR (emulsion polybutadiene) | 1.515 | Cold SBR type polymerization |
| 8 | SBR (combined ST, 8%) | 1.522 | " |
| 9 | SBR (combined ST, 36.5%) | 1.546 | " |
| 10 | cis-BR | 1.514 | JSR BR01 |
| 11 | 1,2-BR | 1.510 | JSR RB810 |
| 12 | EPDM | 1.476 | JSR EP93X |
| 13 | Polypentenamer (trans content, 73%) | 1.507 | Japanese Patent Application Kokai (Laid-open) No. 34,300/73 |
| 14 | High-styrene resin (combined ST, 60%) | 1.567 | Cold SBR type (SBR) |
| 15 | Polyisoprene | 1.519 | JSR IR2200 |
| 16 | High-styrene resin (combined ST, 53%) | 1.561 | Cold SBR type (SBR) |

Note:
ST: styrene
AN: acrylonitrile
IIR: butyl rubber
CR: chloroprene rubber
SBR: styrene-butylene rubber
NBR: acrylonitrile-butadiene rubber
BR: polybutadiene
EPDM: ethylene-propylene-diene terpolymer

EXAMPLE 8

Using a laboratory mill with 4-inch rolls, 60 g of SBR containing 23.5% of combined styrene was banded on the roll. To the banded SBR, was added portionwise 340 g of a ring-opened polymer of 5-norbornene-2-nitrile (intrinsic viscosity of polymer in chlorobenzene at 25° C., $[\eta] = 0.6$), while gradually increasing the roll temperature to 180° C. After completion of the addition, mixing was continued for a further 5 minutes and then the milled mix was sheeted to a thickness of about 2 mm. The resulting sheet, after cooling, was crushed by means of a crusher and molded in the same manner as in Example 7 to obtain test specimens (Comparative run No. 2).

A copolymer was obtained in the same manner as in Example 7 from 340 g of 5-norbornene-2-nitrile and 60 g of SBR containing 23.5% of combined styrene. The resulting copolymer was molded in the same manner as in Example 7 to obtain test specimens (Run No. 17).

In 4 liters of chlorobenzene were dissolved 340 g of the same ring-opened polymer of 5-norbornene-2-nitrile and 60 g of SBR containing 23.5% of combined styrene. The resulting solution was treated in the same manner as in Example 7. The resulting resin was dried in vacuo, further dried in hot air, pelletized, and molded to obtain test specimens (Comparative run No. 3).

The physical properties of the test specimens were measured. The results obtained were as shown in Table 3.

Table 2
Physical properties of the polymers obtained in Example 7

| Run No. | No. of unsaturated polymer (cf. Table 1) | Impact strength KG·cm/cm) | Heat distortion temp. (°C.) | Tensile strength (kg·cm/cm) | Elongation (%) | Hardness (R scale) | Transparency* |
|---|---|---|---|---|---|---|---|
| Comparative 1 | — | 6 | 115 | 530 | 270 | 120 | o |
| 1 | 1 | 33 | 105 | 430 | 300 | 108 | Δ—o |
| 2 | 2 | 28 | 106 | 420 | 290 | 108 | o |
| 3 | 3 | 20 | 106 | 400 | 280 | 108 | o |
| 4 | 4 | 18 | 107 | 370 | 270 | 109 | o |
| 5 | 5 | 16 | 104 | 350 | 260 | 108 | X |
| 6 | 6 | 24 | 105 | 430 | 280 | 108 | Δ—o |
| 7 | 7 | 32 | 102 | 425 | 280 | 108 | X |
| 8 | 8 | 30 | 103 | 425 | 290 | 108 | o |
| 9 | 9 | 17 | 107 | 380 | 220 | 109 | o |
| 10 | 10 | 34 | 101 | 430 | 290 | 107 | X |
| 11 | 11 | 25 | 104 | 390 | 190 | 107 | X |
| 12 | 12 | 17 | 104 | 360 | 210 | 108 | X |
| 13 | 13 | 29 | 101 | 440 | 290 | 107 | X |
| 14 | 14 | 9 | 109 | 350 | 180 | 109 | X |
| 15 | 15 | 33 | 105 | 430 | 290 | 108 | Δ—o |
| 16 | 16 | 11 | 108 | 380 | 200 | 108 | Δ |

Note:* o excellent; Δ good; X fair.

Table 3
Testing methods for physical properties and the results of tests

| | Izod impact strength (kg·cm/cm) | Tensile strength (kg/cm²) | Elongation (%) | Hardness (R scale) | Heat distortion temp. (°C.) | Transparency |
|---|---|---|---|---|---|---|
| Comparative run No. 2 | 7 | 405 | 250 | 113 | 109 | Δ |
| Comparative run No. 3 | 4 | 375 | 225 | 112 | 109 | Δ |
| Run No. 17 | 21 | 440 | 285 | 111 | 108 | o |
| Testing method | ASTM-D-256 | ASTM-D-638 | ASTM-D-638 | ASTM-D-785 | ASTM-D-648 | Visual |

Table 3 shows that simple blending of the components does not result in such a higher impact strength and transparency as those of the copolymer obtained according to this invention.

EXAMPLE 9

Test specimens were prepared in the same manner as in Example 7, except that varied amounts of 5-norbornene-2-nitrile and SBR (combined styrene content, 32%; refractive index, $n_D^{25} = 1.542$) were used to examine the effect of the unsaturated polymer content of the present copolymer upon physical properties. When the SBR content was increased beyond about 40% by weight, the processability of the copolymer became inferior in pelletizing by means of an extruder and in molding. When the said content exceeded 50% by weight, the copolymer showed distinctly rubbery properties. A copolymer containing the SBR in excess of 60% by weight could not be molded under the conditions for molding thermoplastic resins. The results of tests for physical properties conducted in the same manner as in Examples 7 and 8 were as shown in Table 4.

Table 4

| | Ratio between 5-norbornene-2-nitrile and SBR and physical properties of copolymers. | | | | | | |
|---|---|---|---|---|---|---|---|
| Run No. | Comparative run No. 1 | 18 | 19 | 20 | 21 | 22 | 23 |
| 5-Norbornene-2-nitrile (parts by weight) | 100 | 97 | 95 | 70 | 60 | 50 | 40 |
| SBR (parts by weight) | 0 | 3 | 5 | 30 | 40 | 50 | 60 |
| Izod impact strength (kg . cm/cm) | 6 | 8 | 10 | 42 | 48 | 60 | *2 |
| Tensile strength (kg/cm²) | 530 | 525 | 520 | 330 | 260 | 180 | — |
| Elongation (%) | 270 | 270 | 270 | 200 | 155 | 120 | — |
| Hardness (R scale) | 120 | 120 | 119 | 89 | 77 | 65 | — |
| Transparency | ○ | ○ | ○ | ○ | ○ | Δ | X |

Note: *2 The specified test specimen could not be molded.

It is seen from Table 4 that the Izod impact strength can be improved by use of 3 parts or more, particularly 5 parts or more of SBR.

EXAMPLE 10

Copolymerization and preparation of test specimens were performed in a manner similar to that in Example 7. The polar-group-substituted norbornene derivative used was methyl 5-norbornene-2-carboxylate [I]. The ring-opened homopolymer of this compound had a refractive index of 1.542 at 25° C., a notched Izod impact strength of 12 kg.cm/cm, and was transparent. In order to find the conditions necessary for forming a transparent copolymer, 50% by weight of various unsaturated polymers were used in copolymerization, as shown in Table 5. The results of tests for physical properties carried out in the same manner as in Example 7 were as shown in Table 5.

Table 5

| | Physical properties of copolymer of various unsaturated polymers with methyl 5-norbornene-2-carboxylate (weight ratio, 50/50). | | | | |
|---|---|---|---|---|---|
| Run No. | 24 | 25 | 26 | 27 | Comparative run No. 4 |
| No. of unsaturated polymer (cf. Tab. 1) | No. 1 | No. 2 | No. 4 | No. 14 | — |
| Properties of copolymer Refractive index (25° C.) | 1,530 | 1,538 | 1,524 | 1,554 | 1,542 |
| Izod impact strength (kg . cm/cm) | 72 | 65 | 58 | 38 | 12 |
| Tensile strength (kg/cm²) | 185 | 195 | 190 | 270 | 410 |
| Elongation (%) | 310 | 270 | 225 | 190 | 215 |
| Hardness (R scale) | 47 | 47 | 49 | 58 | 92 |
| Transparency | Δ | ○ | X | X - Δ | ○ |

As seen from Table 5, the conditions for obtaining an impact-resistant and transparent copolymer resin in this case, where methyl 5-norbornene-2-carboxylate are the same as in Example 7.

EXAMPLE 11

In a manner similar to that in Example 7, transparency of the copolymer was examined by using two norbornene derivatives [III] and [IV], and each 30 parts by weight of unsaturated polymers No. 6, No. 7, and No. 13 (cf. Table 1).

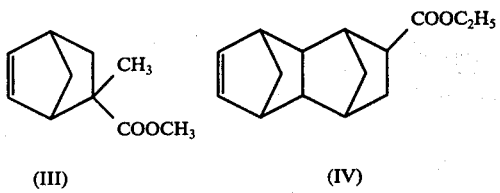

(III)   (IV)

The ring-opened homopolymer of the compound [III] had a refractive index of about 1,526 and that of the compound [IV] had a refractive index of about 1.531. In Examples 7 to 10, the unsaturated polymers No. 7 (polybutadiene) and No. 13 (polypentenamer) gave copolymers of unsatisfactory transparency, while the unsaturated polymer No. 6 (polychloroprene) gave a transparent copolymer. The results obtained were as shown in Table 6.

Table 6

Transparency of copolymers formed from combinations of the compound (III) or (IV) with unsaturated polymers.

| Run No. | Polar-group-substituted norbornene derivative | Unsaturated polymer (cf. Table 1) | Transparency |
|---|---|---|---|
| 28 | Compound (III) | No. 7 | ○ |
| 29 | " | No. 13 | ○ |
| 30 | " | No. 6 | X |
| 31 | Compound (IV) | No. 7 | ○ |
| 32 | " | No. 13 | ○ |
| 33 | " | No. 6 | X |

EXAMPLE 12

The copolymer obtained in Example 7 run No. 2 from SBR (JSR 1502) and 5-norbornene-2-nitrile was subjected to flexural test according to ASTM D638 and the stress was measured when whitening began to appear. For comparison, a blend was prepared by mixing on a roll mill 80 g of purified JSR 1502 and 320 g of a ring-opened polymer of 5-norbornene-2-nitrile, cooling the resulting mix, crushing to a powder by means of a crusher, and pelletizing the powder in the same way as in Example 9. The pellets were molded into test specimens for the flexural test. The results of tests were as shown in Table 7.

Table 7

Results of flexural test.

| Run No. | Flexural strength (kg/cm$^2$) | Stress when whitening appeared (kg/cm$^2$) |
|---|---|---|
| Comparative run 5 | 21,500 | 240 |
| Run No. 34 | 21,000 | 600 |

As seen from Table 7, the blend is more susceptible to flexural whitening as compared with the present copolymer.

EXAMPLE 13

In a 5-liter glass autoclave provided with a stirrer and a jacket for temperature control, under a nitrogen atmosphere, 40 g of each of the unsaturated polymers shown in Table 8, which had been purified by reprecipitation with toluene-methanol, dried in vacuo, and deaerated, was dissolved in 3 liters of purified and dried chlorobenzene. To the resulting solution was added 300 g of 2-chloro-5-norbornene and mixed thoroughly. After successive addition of 200 ml of a chlorobenzene solution of $WCl_6$ (0.05 mole/liter), 20 ml of a chlorobenzene solution of $Al(iso-C_3H_7)_3$ (1 mole/liter), and a small quantity of a chlorobenzene solution of 1-hexene (0.05 mole/liter), the mixture was kept at 70° C. for 8 hours to allow the reaction to proceed. After completion of the reaction, the reaction mixture was poured into a large quantity of methanol containing 1% of 2,6-di-tert-butyl-p-cresol and 1% of hydrochloric acid. The precipitated polymer was washed with methanol, crushed, dried in vacuo for 48 hours, and further dried under a hot air stream at 80° C. for 12 hours.

A substantial part of the polymer thus obtained was a copolymer, as confirmed by solvent extraction test, IR absorption spectroscopy and DSC thermography in the following way. The IR absorption spectrum and DSC thermogram showed that the copolymer obtained above is a high-molecular-weight copolymer of the both components used as starting materials and the extraction tests with solvents such as n-heptane and toluene showed that the unsaturated polymer is scarcely present as such. The copolymer obtained in the form of small lump was crushed by means of a common crusher of the suitable type and pelletized by use of a small extruder (manufactured by Chuo Kikai Co.) at a temperature set at 200° to 260° C. while applying a vacuum of −700 mmHg or higher to the vent zone. The resulting pellets were predried in a hot-air circulating drier at 70° C. for 6 hours and molded by means of a 1-oz. injection machine (manufactured by Yamashiro Seiki Co.) at a temperature set at 200° to 240° C. to prepare test specimens specified in the testing methods shown in Table 8. The specimens were tested for physical properties and flame retardancy according to the testing methods shown in Table 8. The results obtained were as shown in Table 8.

As seen from Table 8, each copolymer obtained in the present Example had a notched Izod impact strength exceeding 10 kg·cm/cm at 25° C., while that of a ring-opened homopolymer of 2-chloro-5-norbornene was 3 kg·cm/cm. It is also seen that a copolymer obtained by use of polychloroprene according to this invention showed a distinguished flame retardancy, while other polymers were comparable to one another in flame retardancy. In Table 8 are also shown the results of burning test conducted according to the method of UL 94 on a specimen prepared by mixing in a small mixer 100 parts by weight of each copolymer and 5 parts by weight of antimony trioxide and molding the resulting mix.

Table 8

Physical properties and flame retardancy of the polymers obtained in Example 13.

| Run No. | Unsaturated polymer used (cf. Tab. 1) | Impact strength (kg · cm/cm) | Tensile strength (kg/cm$^2$) | Elongation (%) | Flame retardancy | Flame retardancy after addition of $Sb_2O_3$ |
|---|---|---|---|---|---|---|
| Comparative Run 6 | — | 3 | 520 | 60 | V-2 | V-0 |
| 35 | No. 1 | 12 | 450 | 70 | V-2 | V-0 |
| 36 | 2 | 15 | 475 | 65 | V-2 | V-0 |
| 37 | 3 | 14 | 460 | 65 | V-2 | V-0 |
| 38 | 4 | 10 | 480 | 60 | V-2 | V-0 |
| 39 | 5 | 11 | 400 | 80 | V-2 | V-0 |
| 40 | 6 | 12 | 450 | 70 | V-0 | V-0 |
| 41 | 10 | 18 | 440 | 60 | V-2 | V-0 |
| 42 | 11 | 10 | 350 | 55 | V-2 | V-0 |
| 43 | 12 | 13 | 375 | 60 | V-2 | V-0 |
| 44 | 15 | 11 | 450 | 70 | V-2 | V-0 |
| Testing method | — | ASTM-D-256 | ASTM-D-638 | ASTM-D-638 | UL-94 | UL-94 |

EXAMPLE 14

In a manner similar to that in Example 13, various polymers were prepared from SBR (No. 2 in Table 1) and tribromophenyl 5-norbornene-2-carboxylate in varied proportions as shown in Table 9. A ring-opened polymer of tribromophenyl 5-norbornene-2-carboxylate was flame-retardant but had a low impact strength of 4 kg·cm/cm. Such a low impact strength was improved, as seen from Table 9, by copolymerization with SBR and the resulting copolymer showed excellent flame retardancy. The ring-opened polymer of Comparative Run No. 7 was difficultly moldable.

Table 9

Physical properties and flame retardancy of the polymers obtained in Example 14.

| Run No. | SBR (parts by weight) | Impact strength (kg . cm/cm) | Tensile strength (kg/cm$^2$) | Elongation (%) | Flame retardancy (No Sb$_2$O$_3$) |
|---|---|---|---|---|---|
| Comparative Run 7 | — | 4 | 450 | 55 | V-0 |
| 45 | 5 | 8 | 435 | 55 | V-0 |
| 46 | 10 | 10 | 420 | 70 | V-0 |
| 47 | 20 | 24 | 380 | 80 | V-0 |
| 48 | 30 | 32 | 330 | 95 | V-0 |
| 49 | 40 | Not broken | 280 | 120 | V-0 |
| Testing method | — | ASTM-D-256 | ASTM-D-638 | ASTM-D-638 | UL-94 |

EXAMPLE 15

In a manner similar to that in Example 13, copolymers with varied halogen content were prepared from 20 parts by weight of SBR and mixtures of monobromophenyl 5-norbornene-2-carboxylate (halogen content, 27.3% by weight; compound (V)) and methyl 5-norbornene-2-carboxylate (compound (I)) in varied proportions. Flame retardancy of these copolymers were tested according to the burning test specified in UL-94. Antimony trioxide (5 parts by weight) was incorporated in 100 parts by weight of each copolymer and subjected to the burning test. The results were as shown in Table 10. It was found that a copolymer containing 5% by weight or more of a halogen may be classified as V-2 (UL-94).

Table 10

| Compound (V) (parts by weight) | Compound (I) (parts by weight) | Halogen content of polymer (% by weight) | Test of flame retardancy (UL-94:V-2) | Test of flame retardancy of Sb$_2$O$_3$-containing specimen (UL-94:V-2) |
|---|---|---|---|---|
| 0 | 80 | 0 | No | No |
| 20 | 60 | 5.5 | No | Passed |
| 40 | 40 | 10.9 | Passed | Passed |
| 60 | 20 | 16.4 | Passed | Passed |
| 80 | 0 | 21.8 | Passed | Passed |

EXAMPLE 16

In a 300-ml glass autoclave which had been flushed with nitrogen to replace air, 3 g of cis-1,4-polybutadiene (JSR BR01, brand name, Japan Synthetic Rubber Co.), which had been purified by reprecipitation with toluenemethanol, dried in vacuo, and deaerated, was dissolved in 144 ml of chlorobenzene. To the resulting solution was added 5 g of tribromophenyl 2-norbornene-5-carboxylate and thoroughly mixed. After successive addition of 5 ml of a toluene solution of WCl$_6$ (0.05 mole/liter) and 0.5 ml of a toluene solution of triethylaluminum (1 mole/liter), the reactor was sealed and kept at 30° C. for 10 hours to allow the reaction to proceed to obtain 7 g of a copolymer.

The copolymer was ignited with the flame of a gas burner consecutively twice for each 10 seconds. The flame was self-extinguished in a short time, indicating that the copolymer is flame retardant.

EXAMPLE 17

In a 5-liter glass autoclave and under a nitrogen atmosphere, 160 g of each of the unsaturated polymers shown in Table 11, which had been purified by reprecipitation with toluene-methanol, dried in vacuo, and deaerted, was dissolved in 1.6 liters of chlorobenzene. To one-half of the resulting solution was added 240 g of 5-norbornene-2-nitrile (compound (II)) and thoroughly mixed. After successive addition of 100 ml of a toluene solution of WCl$_6$ (0.05 mole/liter), 10 ml of a toluene solution of Al(iso-C$_3$H$_7$)$_3$ (1mole/liter), and a small quantity of a toluene solution of 1-hexene (0.05 mole/liter) used as a molecular weight regulator, the mixture was kept at 70° C. for 1 hour to allow the reaction to proceed. To the reaction mixture was added the remaining half of the unsaturated polymer solution. After thorough mixing, the resulting mixture was allowed further to react at 70° C. for 4 hours. After completion of the reaction, the reaction mixture was poured into a large quantity of methanol containing 1% of 2,6-di-tert-butyl-p-cresol and 1% of hydrochloric acid. The precipitated copolymer was washed with methanol, crushed, dried in vacuo for 48 hours, and further dried under a hot air stream at 80° C. for 12 hours. The resulting resin in the form of small lump was pulverized by means of a crusher (powder [E]).

On the other hand, a ring-opened polymer of the 5-norbornene-2-nitrile in powder form (powder [F]) was obtained in the same manner as mentioned above, except that the unsaturated polymer was not used, 400 g of 5-norbornene-2-nitrile was used, and the molecular weight of the resulting polymer was regulated with 1-hexene to be nearly the same as that of the powder [E].

Equal amounts of the powder [E] and the powder [F] were mixed in a Henschel mixer and pelletized by means of a small extruder (manufactured by Chuo Kikai Co.) at a temperature set at 200° to 240° C. while applying a vacuum of −700 mmHg or higher to the vent zone. The resulting pellets were predried in a hot-air circulating drier at 70° C. for 2 hours and molded by means of a 1-oz injection machine (manufactured by Yamashiro Seiki Co.) at a temperature set at 200° to 240° C. to prepare test specimens specified in the testing methods shown in Table 11.

The results of tests for physical properties, conducted as specified were as shown in Table 11. From Table 11, it is seen that the blend of the powder [E] and powder [F] is far superior in impact resistance to the homopolymer of 5-norbornene-2-nitrile and also superior in tensile strength, het distortion temperature, and hardness to the present copolymer with equal rubber content.

imens in the same manner as in Example 7 (Comparative Run 8).

Table 12

| Run No. | Impact strength (kg . cm/cm) | Tensile strength (kg/cm²) | Elongation (%) | Heat distortion temperature (° C) | Hardness (R scale) |
| --- | --- | --- | --- | --- | --- |
| Comparative Run 1 | 6 | 350 | 270 | 115 | 120 |
| Comparative Run 8 | 15 | 350 | 180 | 111 | 113 |
| Run 55 | 23 | 470 | 285 | 110 | 112 |
| Run 6 | 24 | 430 | 280 | 105 | 108 |

As seen from Table 12, although the impact strength was increased by mechanically blending with a rubber (Comparative Run 8), the present copolymer (Run No. 6) had a higher impact strength, and the present copolymer can be further improved in tensile strength, heat distortion temperature, and hardness by blending with the ring-opened polymer (Run No. 55).

EXAMPLE 19

In a manner similar to that in Example 17, various copolymers with varied polyisoprene content were obtained from 5-norbornene-2-nitrile and polyisoprene. The copolymer obtained was blended with the ring-opened polymer of 5-norbornene-2-nitrile (powder [F])

Table 11

| | Physical properties of the polymers obtained in Example 17. | | | | | |
| --- | --- | --- | --- | --- | --- | --- |
| Run No. | Unsaturated polymer (No. in Table 1) | Impact strength (kg . cm/cm) | Tensile strength (kg/cm²) | Elongation (%) | Heat distortion temperature (° C.) | Hardness (R scale) |
| Comparative Run 1 | — | 6 | 530 | 270 | 115 | 120 |
| 50 | 1 | 30 | 455 | 290 | 109 | 112 |
| 51 | 2 | 28 | 460 | 285 | 110 | 111 |
| 52 | 3 | 19 | 450 | 270 | 109 | 111 |
| 53 | 4 | 19 | 440 | 270 | 110 | 113 |
| 54 | 5 | 20 | 415 | 265 | 108 | 112 |
| 55 | 6 | 23 | 470 | 285 | 110 | 112 |
| 56 | 10 | 32 | 480 | 270 | 108 | 112 |
| 57 | 11 | 25 | 450 | 250 | 109 | 112 |
| 58 | 12 | 18 | 420 | 235 | 109 | 111 |
| 59 | 15 | 31 | 460 | 285 | 110 | 111 |
| Testing method, ASTM | — | D 256 | D 638 | D 638 | D 648 | D 785 |

EXAMPLE 18

Using a laboratory mill with 4-inch rolls, 60 g of polychloroprene (No. 6 in Table 1) was banded on the roll. To the banded polychloroprene, was added portionwise 240 g of the ring-opened polymer of 5-norbornene-2-nitrile (powder [F] in Example 17), while gradually elevating the roll temperature to about 180° C. After completion of the addition, mixing was continued for further 5 minutes. While cooling the rolls, the milled stock was sheeted to a thickness of about 2 mm. The resulting sheet was crushed and molded to the test specobtained in Example 17 to regulate the rubber content and tested for physical properties on the test specimens prepared in the same way as in Example 17. When the present copolymer having a 5-norbornene-2-nitrile to polyisoprene ratio smaller than 20/80 was blended with the powder [F], the molded specimen showed undesirable flow-mark and uneven gloss, while when said ratio was greater than 90/10, the improvement in tensile strength, heat distortion temperature, and hardness becomes insignificant and so such copolymers become of little merit inasmuch as their production and blending require considerable amount of cost and labor.

Table 13

| | | Physical properties of the blends prepared in Example 19. | | | | | | | | |
| --- | --- | --- | --- | --- | --- | --- | --- | --- | --- | --- |
| | Run No. | Comparative Run 1 | 60 | 15 | 59 | 61 | 62 | 111 63 | 64 | 65 |
| Composition of copolymer | Norbornene derivative (parts by weight) | 0 | 90 | 80 | 60 | 40 | 20 | 80 | 95 | 90 |
| | Polyisoprene | | | | | | | | | |

Table 13-continued

| | Physical properties of the blends prepared in Example 19. | | | | | | | |
|---|---|---|---|---|---|---|---|---|
| Run No. | Comparative Run 1 | 60 | 15 | 59 | 61 | 111 62 | 63 | 64 | 65 |
| (parts by weight) | 0 | 10 | 20 | 40 | 60 | 80 | 20 | 5 | 10 |
| Powder (F) (parts by weight) | 100 | 0 | 0 | 100 | 200 | 300 | 100 | 0 | 100 |
| Impact strength (kg . cm/cm) | 6 | 17 | 33 | 31 | 25 | 20 | 16 | 9 | 9 |
| Tensile strength (kg/cm²) | 530 | 450 | 430 | 460 | 480 | 490 | 480 | 510 | 515 |
| Elongation (%) | 270 | 280 | 290 | 285 | 270 | 265 | 280 | 270 | 270 |
| Heat distortion temperature (° C.) | 115 | 107 | 105 | 110 | 110 | 111 | 111 | 113 | 114 |
| Hardness (R scale) | 120 | 110 | 108 | 112 | 113 | 114 | 114 | 117 | 118 |

EXAMPLE 20

A powder [G] was obtained from 200 g of the unsaturated polymer No. 12 (EPDM) in Table 1 and 200 g of a norbornene derivative,

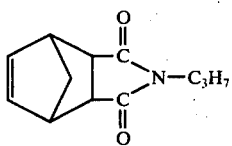

(compound [VI]) by the procedure used in preparing the powder [E] in Example 17.

A ring-opened polymer of the compound [VI] (powder [H]) was obtained by the procedure used in preparing the powder [F] in Example 17.

In the same manner as in Example 17, various blends were prepared from the powder [G] and the powder [H] in varied mixing ratios and the blends were molded to obtain test specimens. The results of tests for physical properties were as shown in Table 14.

Table 14

| | Physical properties of the blends obtained in Example 20. | | | | | | |
|---|---|---|---|---|---|---|---|
| Run No. | Powder (G) (% by weight) | Powder (H) (% by weight) | Impact strength (kg . cm/cm) | Tensile strength (kg/cm²) | Elongation (%) | Heat distortion temperature (° C.) | Hardness (R scale) |
| Comparative Run 9 | 0 | 100 | 3 | 550 | 70 | 125 | 127 |
| 66 | 10 | 90 | 7 | 530 | 80 | 120 | 120 |
| 67 | 20 | 80 | 12 | 505 | 100 | 116 | 105 |
| 68 | 80 | 20 | 43 | 450 | 180 | 70 | 77 |

EXAMPLE 21

In a 300-ml glass autoclave and under a nitrogen atmosphere, 1.0 g of a cis-1,4-polybutadiene, which had been purified as in Example 7, was dissolved in 150 ml of chlorobenzene. To the resulting solution was added 4.5 g of methyl 5-norbornene-2-methyl-2-carboxylate and mixed thoroughly. After addition of 0.05 millimole of $MoCl_5$ and 0.2 millimole of $Al(C_2H_5)Cl_2$, the reactor was sealed and kept at 70° C. for 17 hours to allow the reaction to proceed to obtain 4.8 g of a copolymer.

What is claimed is:

1. A copolymer obtained by reacting
   a. at least one norbornene compound having at least one polar group or polar group containing substituent, wherein said polar group is selected from the group consisting of ester, nitrile, amino, halogen, imino and carboxylic anhydride with
   b. at least one unsaturated polymer having carbon-to-carbon double bonds in the presence of a metathesis catalyst.

2. The copolymer according to claim 1, wherein the norbornene derivative [A] is selected from the group consisting of compounds represented by the formulas:

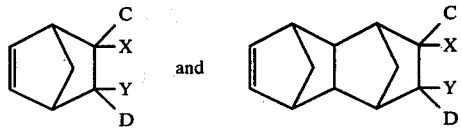

wherein C and D are independently hydrogen or hydrocarbon group having 1 to 10 carbon atoms; X and Y are independently hydrogen or hydrocarbon groups having 1 to 10 carbon atoms, halogen atoms, halogen-substituted hydrocarbon groups having 1 to 10 carbon atoms, —(CH₂)$_n$COOR¹, —(CH₂)$_n$OCOR¹, —(CH₂)$_n$CN, —(CH₂)$_n$CONR²R³, —(CH₂)$_n$COOZ, —(CH₂)$_n$OCOZ, or —(CH₂)$_n$OZ in which R¹, R², and R³ are independently hydrocarbon groups having 1 to 20 carbon atoms; Z is a halohydrocarbon group having 1 to 20 carbon atoms; and n is 0 or an integer of 1 to 10; X and Y may form jointly

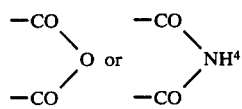

in which R⁴ is hydrogen or a hydrocarbon group having 1 to 20 carbon atoms; and at least one of X and Y is said group other than hydrogen or the hydrocarbon group.

3. The copolymer according to claim 1, wherein the norbornene derivative [A] is selected from the group consisting of methyl 5-norbornene-2-carboxylate, ethyl 5-norbornene-2-carboxylate, methyl 2-methyl-5-norbornene-2-carboxylate, butyl 3-phenyl-5-norbornene-2-carboxylate, dimethyl 5-norbornene-2,3-dicarboxylate, cyclohexyl 5-norbornene-2-carboxylate, allyl 5-norbornene-2-carboxylate, 5-norbornene-2-yl acetate, 5-norbornene-2-nitrile, 3-methyl-5-norbornene-2-nitrile, 2,3-dimethyl-5-norbornene-2,3-dinitrile, 5-norbornene-2-carboxamide, N-methyl-5-norbornene-2-carboxamide, N,N-diethyl-5-norbornene-2-carboxamide, N,N,N',N'-tetramethyl-5-norbornene-2,3-dicarboxamide, 2-chloro-5-norbornene, 2-methyl-2-chloro-5-norbornene, chloroethyl 5-norbornene-2-carboxylate, dibromopropyl 5-norbornene-2-carboxylate, dichloropropyl 5-norbornene-2-carboxylate, monobromophenyl 5-norbornene-2-carboxylate, tribromophenyl 5-norbornene-2-carboxylate, 2-bromo-5-norbornene, 2-bromomethyl-5-norbornene, tribromobenzyl 5-norbornene-2-carboxylate, 5-norbornene-2,3-dicarboxylic anhydride, 2,3-dimethyl-5-norbornene-2,3-dicarboxylic anhydride, 5-norbornene-2,3-dicarboximide, and N-phenyl-2-methyl-5-norbornene-2,3-dicarboximide.

4. The copolymer according to claim 1, wherein the norbornene derivative is selected from the group consisting of 2-cyano-1,2,3,4,4a,5,8,8a-octahydro-1,4;5,8-dimethanonaphthalene, 2-carbomethoxy-1,2,3,4,4a,5,8,-8a-octahydro-1,4;5,8-dimethanonaphthalene and 2-chloro-1,2,3,4,4a,5,8,8a-octahydro-1,4;5,8-dimethanonaphthalene.

5. The copolymer according to claim 1, wherein the norbornene derivative [A] is selected from 5-norbornene-2-nitrile and 3-methyl-5-norbornene-2-nitrile.

6. The copolymer according to claim 1, wherein the norbornene derivative [A] is selected from the group consisting of 2-chloro-5-norbornene, 2-methyl-2-chloro-8-norbornene, chloroethyl 5-norbornene-2-carboxylate, dibromopropyl 5-norbornene-2-carboxylate, dichloropropyl 5-norbornene-2-carboxylate, monobromophenyl 5-norbornene-2-carboxylate, tribromophenyl 5-norbornene-2-carboxylate, 2-bromo-5-norbornene, 2-bromomethyl-5-norbornene, and tribromobenzyl 5-norbornene-2-carboxylate.

7. The copolymer according to claim 1, wherein the unsaturated polymer is selected from the group consisting of polybutadiene, styrene-butadiene copolymer, acrylonitrile-butadiene copolymer, polychloroprene, polyisoprene, natural rubber, ethylene-propylene-diene terpolymer, polyalkenamer, and butyl rubber.

8. The copolymer according to claim 1, wherein the metathesis catalyst consists essentially of a combination of (a) at least one compound selected from the group consisting of compounds of W, Mo, Re and Ta and (b) at least one compound selected from the group consisting of compounds of elements of Groups IA, IIA, IIB, IIIA, IVA, and IVB of Deming's Periodic Table which have at least one element-to-carbon bond or element-to-hydrogen bond.

9. The copolymer according to claim 8, wherein the compound (a) is selected from the group consisting of halides, oxyhalides, alkoxyhalides, phenoxyhalides, alkoxides, phenoxides, carboxylates, (oxy)acetylacetonates, carbonyl complexes, acetonitrile complexes, and hydride complexes of W, Mo, Re and Ta and derivatives of these compounds.

10. The copolymer according to claim 8, wherein the compound (a) is selected from the group consisting of halides, oxyhalides, alkoxyhalides and phenoxyhalides of W and Mo.

11. The copolymer according to claim 8, wherein the compound (a) is selected from the group consisting of $WCl_6$, $WCl_5$, $WCl_4$, $WBr_6$, $WF_6$, $WI_6$, $MoCl_5$, $MoCl_4$, $MoCl_3$, $ReCl_5$, $TaCl_5$, $TaBr_5$, $WOCl_4$, $MoOCl_3$, $ReOCl_3$, $ReOBr_3$, $W(OC_6H_5)_6$, $WCl_2(OC_6H_5)_4$, $Mo(OC_2H_5)_2Cl_3$, $Mo(OC_2H_5)_5$, $MoO_2(acac)_2$, $W(OCOR)_3$, $W(CO)_6$, $Mo(CO)_6$, $Re_2(CO)_{10}$, $ReOBr_3 \cdot P(C_6H_5)_3$, $WCl_5 \cdot P(C_6H_5)_3$, $WCl_6 \cdot C_5H_5N$, $W(CO)_5 \cdot P(C_6H_5)_3$, and $W(CO)_3(CH_3CN)_3$, in which acac means acetylacetonate.

12. The copolymer according to claim 8, wherein the compound (b) is selected from the group consisting of n-$C_4H_9Li$, n-$C_5H_{11}Na$, $C_5H_5Na$, $CH_3MgI$, $C_2H_5MgBr$, $CH_3MgBr$, n-$C_3H_7MgCl$, t-$C_4H_9MgCl$, $CH_2=CH-CH_2-Mg-Cl$, $(C_2H_5)_2Zn$, $(C_2H_5)_2Cd$, $CaZn(C_2H_5)_4$, $(CH_3)_3B$, $(C_2H_5)_3B$, (n-$C_4H_9)_3B$, $(CH_3)_3Al$, $(CH_3)_2AlCl$, $(CH_3)_3Al_2Cl_3$, $CH_3AlCl_2$, $(C_2H_5)_3Al$, $LiAl(C_2H_5)_4$, $(C_2H_5)_2AlH$, (iso-$C_4H_9)_2AlH$, $(C_2H_5)_2AlOC_2H_5$, (iso-$C_4H_9)_3Al$, $(C_2H_5)_3Al_2Cl_3$, $(CH_3)_4Ge$, $(CH_3)_4Sn$, (n-$C_4H_9)_4Sn$, (n-$C_6H_{13})_3Al$, (n-$C_8H_{17})_3Al$, $LiH$, $NaH$, $B_2H_6$, $NaBH_4$, $AlH_3$, $LiAlH_4$, and $TiH_4$.

13. The copolymer according to claim 8, wherein the compound (b) is selected from the group consisting of organo compounds of Zn, B, Al, and Sn.

14. The copolymer according to claim 8, wherein the compound (b) is selected from the group consisting of $(CH_3)_3Al$, $(CH_3)_2AlCl$, $(CH_3)_3Al_2Cl_3$, $CH_3AlCl_2$, $(C_2H_5)_3Al$, $LiAl(C_2H_5)_4$, $(C_2H_5)_2AlH$, (iso-$C_4H_9)_2AlH$, $(C_2H_5)_2AlOC_2H_5$, (iso-$C_4H_9)_3Al$, $(C_2H_5)_3Al_2Cl_3$, (n-$C_6H_{13})Al$, (n-$C_8H_{17})_3Al$, $AlH_3$ and $LiAlH_4$.

15. The copolymer according to claim 8, wherein the ratio of the compound (a) to the compound (b) is in the range of from 1:1 to 1:20 in terms of number of metal atoms.

16. The copolymer according to claim 15, wherein the ratio ranges from 1:2 to 1:10.

17. The copolymer according to claim 8, wherein the catalyst further consists essentially of:
c. an activator selected from the group consisting of organo- and non-organo- compounds of boron and silicon, alcohols, hydroperoxides, peroxides, water, oxygen, carbonyl compounds, cyclic ethers, amides, amines, azo compounds, N-nitroso compounds and compounds containing S—Cl of N—Cl group.

18. The copolymer according to claim 17, wherein the activator is selected from the group consisting of $BF_3$, $BCl_3$, $B(O-n-C_4H_9)_3$, $(C_2H_5O)_2BF$, $B_2O_3$, $H_3BO_3$, $Si(OC_2H_5)_4$, alcohols, hydroperoxides, peroxides, water, oxygen, aldehydes, ketones, ethylene oxide, epichlorohydrin, dioxane, trioxane, oxetane, N,N-diethylformamide, N,N-dimethylacetamide, aniline, morpholine, piperidine, azobenzene, N-nitrosodimethylamine, N-nitrosodiphenylamine, trichloromelamine, N-chlorosuccinimide and phenylsulfenyl chloride.

19. The copolymer according to claim 1, wherein the weight proportion of the norbornene derivative [A] in the copolymer ranges from 0.1% by weight to 99% by weight.

20. The copolymer according to claim 1, wherein the weight proportion of the norbornene derivative [A] in the copolymer ranges from 3 to 30% by weight.

21. The copolymer according to claim 1, wherein the weight proportion of the norbornene derivative [A] in the copolymer ranges from 50 to 97% by weight.

22. The copolymer according to claim 1, wherein the weight proportion of the norbornene derivative [A] in the copolymer ranges from 70 to 95% by weight.

23. The copolymer according to claim 21, wherein the norbornene derivative [A] is selected from the group consisting of norbornene derivatives having at least one halogen atom or at least one halogen-containing substituent, and the halogen content in the copolymer is at least 5% by weight.

24. The copolymer according to claim 21, wherein the unsaturated polymer has a refractive index in the range from the refractive index of the ring-opened polymer of the norbornene derivative plus 0.02 to the refractive index of said polymer minus 0.025.

25. A composition of the copolymer according to claim 1 in which the weight ratio of the component [A] to the component [B] ranges from 20/80 to 90/10 and a ring-opened polymer of the component [A] in such a proportion that 3 to 50% by weight of the component [B] is contained in the composition.

26. A process for producing a copolymer which comprises reacting [A] at least one norbornene derivative having at least one polar group or polar-group-containing substituent with [B] at least one unsaturated polymer having carbon-to-carbon double bonds with a metathesis catalyst.

27. The process according to claim 26, wherein the reaction is effected in a solvent.

28. The process according to claim 27, wherein the solvent is an aliphatic, cycloaliphatic or aromatic hydrocarbon or halohydrocarbon.

29. The process according to claim 26, wherein the reaction is effected in an inert atmosphere.

30. The process according to claim 29, wherein the inert atmosphere is nitrogen, helium or argon.

31. The process according to claim 26, wherein the reaction is effected at a temperature ranging from −30° C to 200° C.

* * * * *

UNITED STATES PATENT AND TRADEMARK OFFICE
CERTIFICATE OF CORRECTION

PATENT NO. : 4,039,491
DATED : August 2, 1977
INVENTOR(S) : Hiroharu Ikeda, et al It is certified that error appears in the above-identified patent and that said Letters Patent are hereby corrected as shown below:

At [30] Change "May 17, 1975" to --May 15, 1975--

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*